United States Patent [19]
Wang

[11] Patent Number: 5,290,136
[45] Date of Patent: Mar. 1, 1994

[54] DRIVING DEVICE FOR A MILLING MACHINE

[76] Inventor: Daniel Wang, No. 9, Naomi Court, Cherrybrook NSW 2126, Australia

[21] Appl. No.: 5,754

[22] Filed: Jan. 19, 1993

[51] Int. Cl.$^5$ .............................................. B23C 5/26
[52] U.S. Cl. ................................ 409/233; 408/239 R
[58] Field of Search ..................... 409/233, 231, 232; 408/239 R, 238; 173/163

[56] References Cited

U.S. PATENT DOCUMENTS 3,898,911  8/1975  DeCaussin ........................ 409/233
4,511,295  4/1985  Razdobreev ..................... 409/233
4,750,850  6/1988  Husted ............................. 409/233

Primary Examiner—William Briggs
Attorney, Agent, or Firm—Poms, Smith, Lande & Rose

[57] ABSTRACT

A driving device for driving a head of a rod in a milling machine includes a board slidable up and down relative to the milling machine, a driving mechanism disposed on the board, a socket secured to the lower end of the driving mechanism and located above the head of the rod, a cylinder disposed on the bolt, a piston fixed on top of the bolt and slidably engaged in the cylinder. The socket is engaged with the head of the rod when the board and the driving mechanism are moved downward by the cylinder.

3 Claims, 6 Drawing Sheets

DRIVING DEVICE FOR A MILLING MACHINE

BACKGROUND OF THE INVENTION

1. Field of the Invention

The present invention relates to a driving device, and more particularly to a driving device for a milling machine.

2. Description of the Prior Art

A typical driving device for a milling machine is disclosed in FIG. 7 and comprises a cylinder 50 including a number of posts 51 extended upward therefrom, a chamber 52 formed in the bottom portion, a mouth 53 for supplying pressurized air into the cylinder 50, a piston rod 54 slidably extended into the cylinder 50 and a piston 55 slidably engaged in the cylinder 50, a pneumatic driving mechanism 56 disposed on top of the piston 54 and moving in concert with the piston 55, an engaging surface 57 formed in the piston 55, and a rod 61 including a head 62 formed in the upper end for engagement with the engaging surface 57 when the piston 55 moves downward, and a milling cutter 64 threadedly engaged to the lower end of the rod 61. The pneumatic driving mechanism 56 is provided to rotate the rod 61 so as to threadedly engage the rod 61 to the cutter 64.

However, the whole pneumatic driving mechanism 56 is supported on the piston rod 54 and moves in concert with the piston rod 54, such that a great pneumatic power is required to move both the piston rod 54 and the pneumatic driving mechanism 56. In addition, the center of gravity of the pneumatic driving mechanism 56 is highly elevated such that the mechanism 56 can not be stably supported in place, and such that shocks and vibrations and thus noise may occur. Furthermore, the stroke of the piston 55 is predetermined and can not be changed such that the mechanism 56 is suitable for driving only one type of the rods 61.

The present invention has arisen to mitigate and/or obviate the afore-described disadvantages of the conventional driving devices for milling machine.

SUMMARY OF THE INVENTION

The primary objective of the present invention is to provide a driving device for a milling machine which has a lowered center of gravity and is stably supported and with which noise is greatly decreased.

In accordance with one aspect of the invention, there is provided a driving device for driving a head of a rod in a milling machine comprising a column disposed on the milling machine, a bolt threaded to the milling machine, a board slidably engaged on the column and the bolt, a driving mechanism disposed on the board and including a lower end extended downward through the board, a socket secured to the lower end of the driving mechanism and located above the head of the rod, a cylinder disposed on the bolt, a piston fixed on top of the bolt and slidably engaged in the cylinder, and means for biasing the board upward along the column and the bolt, whereby, the socket is caused to engage with the head of the rod when the board and the driving mechanism are moved downward by the cylinder and when the piston moves upward relative to the cylinder.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
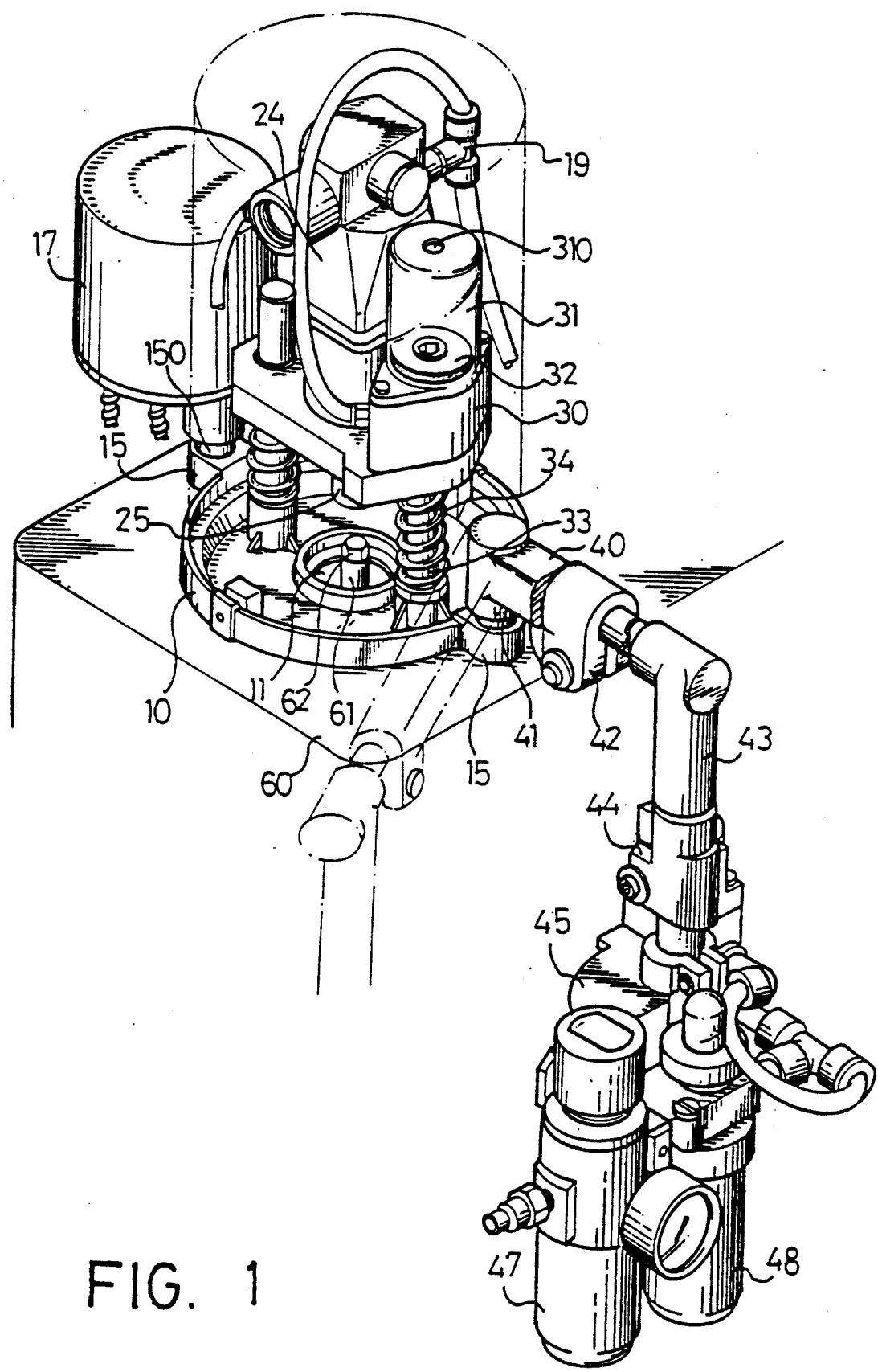
FIG. 1 is a perspective view of a driving device for a milling machine in accordance with the present invention.
Figure 2:
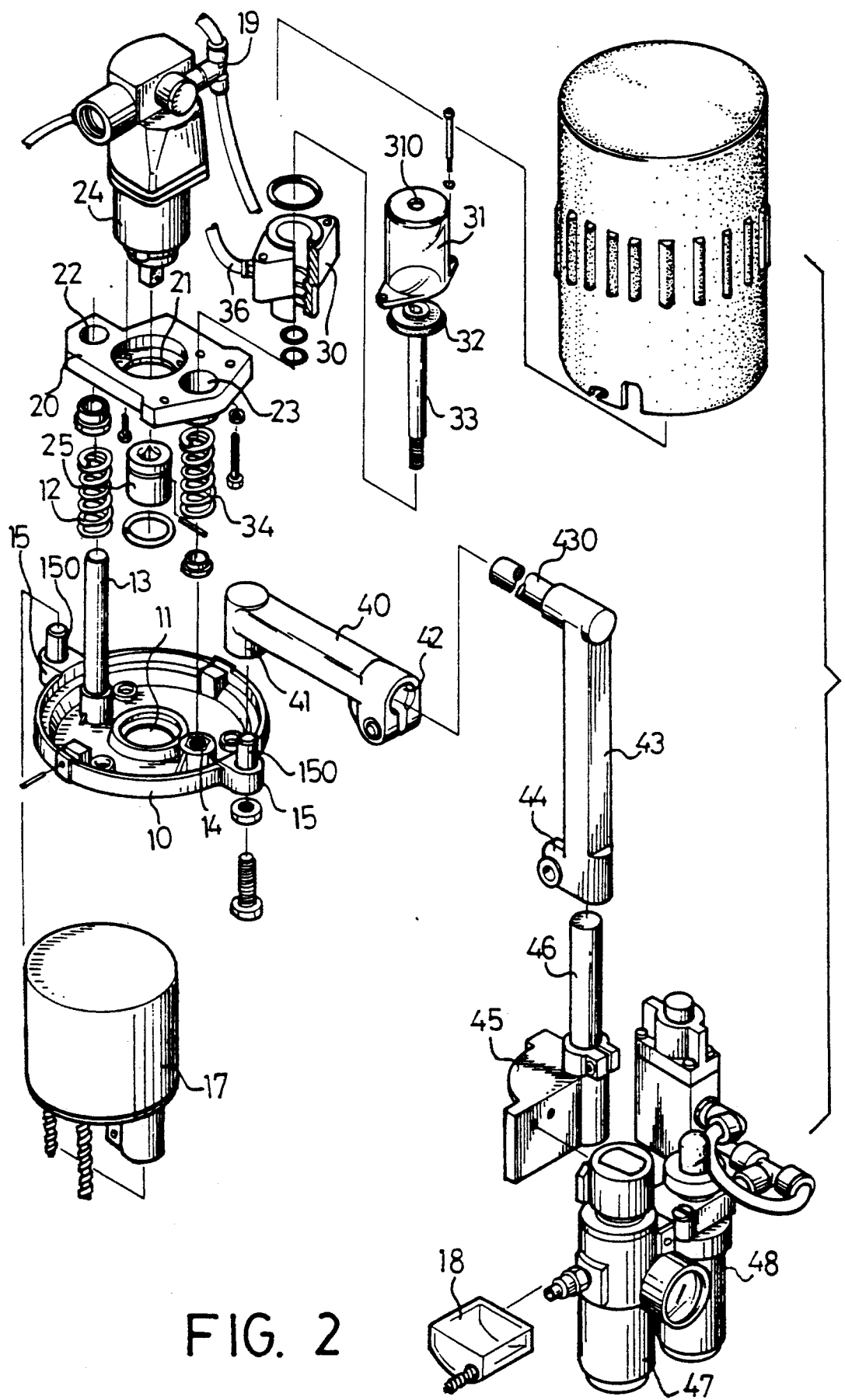
FIG. 2 is an exploded view of the driving device.
Figure 3:
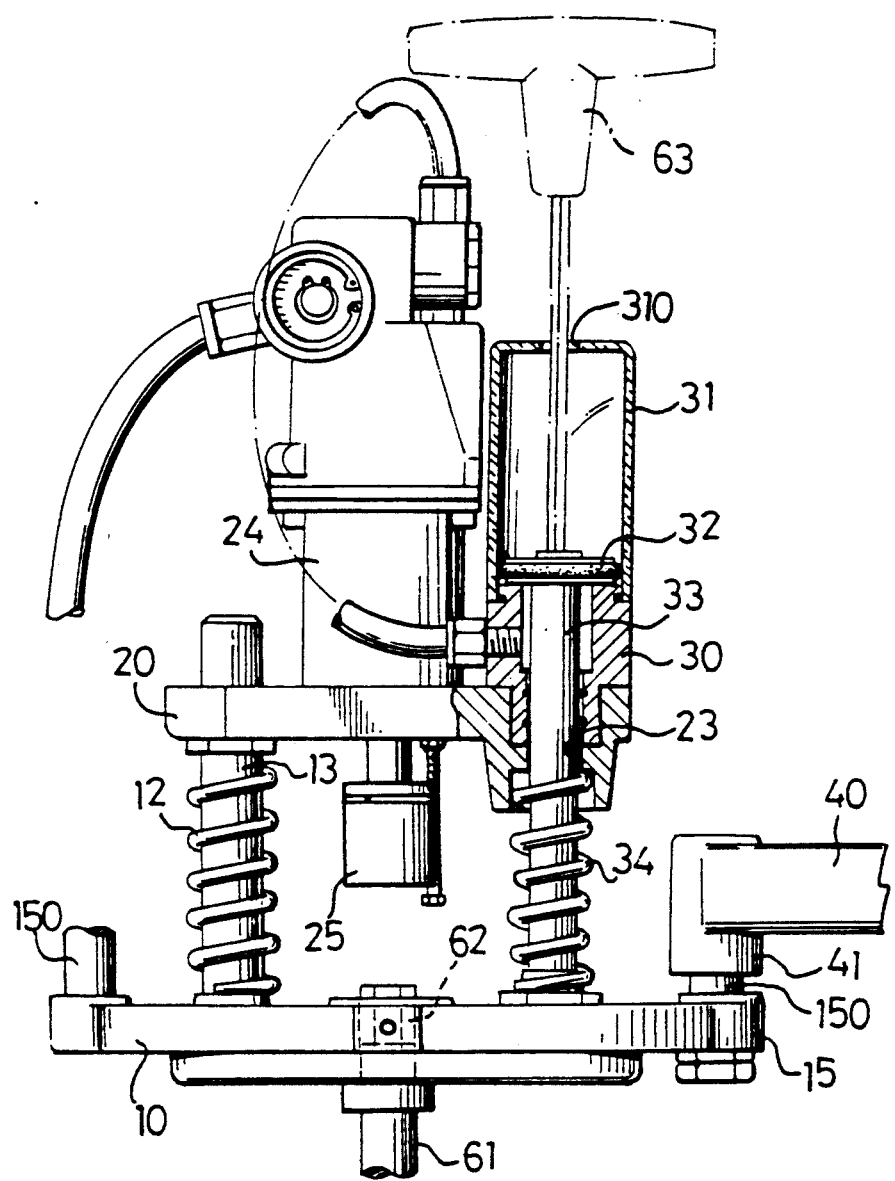
FIGS. 3 and 4 are partial cross sectional views illustrating the operations of the driving mechanism.

Referring to the drawings, and initially to FIGS. 1 to 3, a driving device of a milling machine in accordance with the present invention comprises a seat 10 provided on a base 60 of the milling machine and having an opening 11 formed in the center thereof, a rod 61 slightly extended upward through the opening 11 and beyond the base 60 and including a head 62 formed integral on top thereof, a pair of hubs 14 oppositely formed in the seat 10, a column 13 having a lower end secured in one of the hubs 14, the other hub 14 including a screw hole formed therein, a spring 12 engaged on the column 13, a pair of lugs 15 oppositely formed on the seat 10, and a protrusion 150 engaged in each of the lugs 15. A safety switch 17 is preferably disposed on one of the protrusions 150. A bolt 33 includes a lower end threadedly engaged with the screw hole of the hub 14 and includes a piston 32 provided on top thereof. A spring 34 is engaged on the bolt 33. A board 20 includes two holes 22, 23 slidably engaged with the column 13 and the bolt 33 respectively and resilient supported on the springs 12, 34, and includes an aperture 21 formed in the center thereof.

A pneumatic driving mechanism 24 is disposed on the board 20 and includes a lower end extended downward through the aperture 21 of the board 20, a socket 25 is secured to the lower end of the pneumatic driving mechanism 24. A three-way coupler 19 is coupled to the mechanism 24 for controlling the pressurized air into the mechanism 24 in order to operate the mechanism 24. A coupler 30 is disposed on the board 20 and engaged with the hole 23 of the board 20, a cylinder 31 is engaged on the coupler 30, and the piston 32 is slidably engaged in the cylinder 31. A pipe 36 is connected to the coupler 30 for supplying pressurized air into the coupler 30 and the cylinder 31 for moving the piston 32 upwards. It is to be noted that the cylinder 31 and the board 20 move downward when the piston 32 is caused to move upward. An emptiness 310 is formed in top of the cylinder 31.

An arm 40 includes a stub 41 secured on the other protrusion 150 and includes a connector 42 provided opposite to the stub 41, a lever 43 includes a shaft 430 secured in the connector 42 and a connector 44 provided on the lower portion thereof. A post 46 has an upper end secured in the connector 44 and includes a bracket 45 disposed on the lower portion thereof. An oil filter 47 and an oil container 48 for containing lubricating oil are secured to the bracket 45, the lubricating oil may flow into the cylinder 31 for lubricating purposes. A safety means 18 is preferably secured to the oil filter 17.

Figure 4:
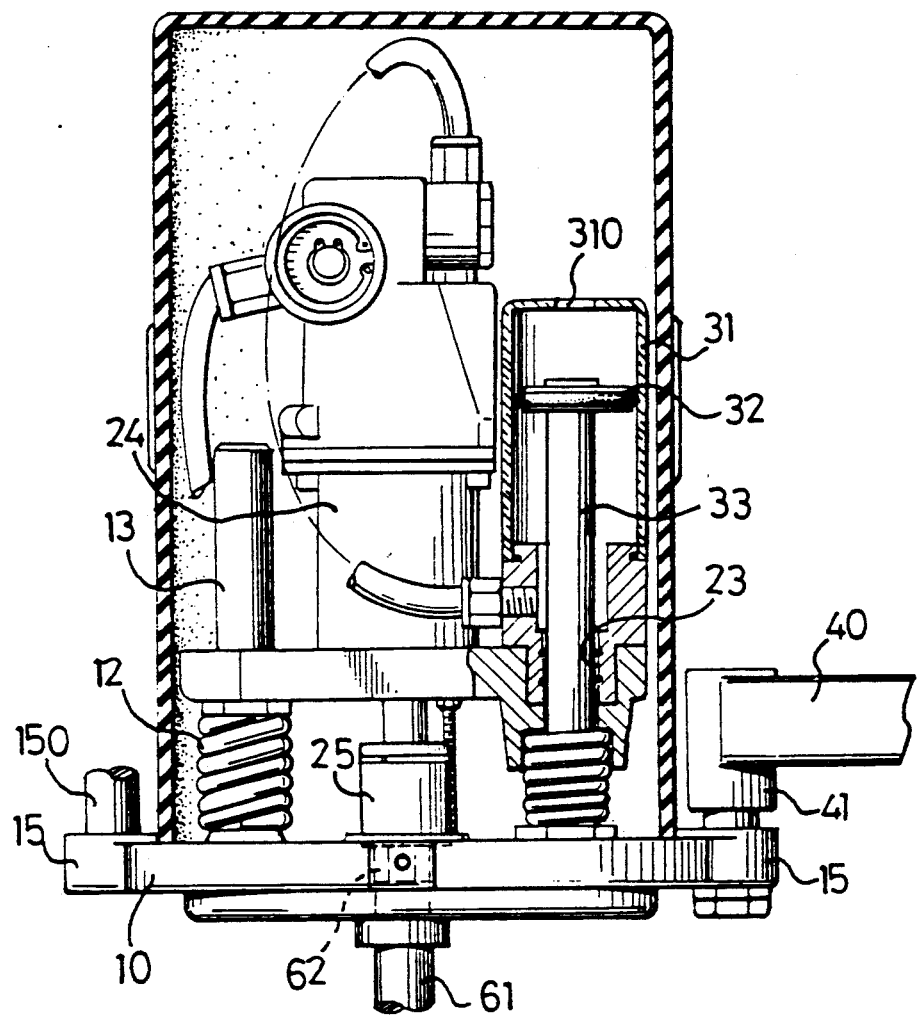
Figure 5:
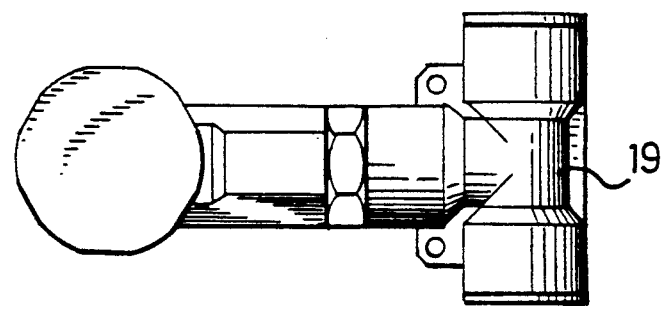
FIG. 5 is a plane view showing a coupler.

Referring next to FIGS. 3 and 4, in operation, when pressurized air is supplied into the coupler 30, the piston 32 is caused to move upward relative to the cylinder 31 such that the board 20 and the cylinder 31 are caused to move downward toward the seat 10 of the milling machine, and such that, as shown in FIG. 4, the socket 25 is caused to engage with the head 62 of the rod 61, whereby, the rod 61 can be rotated by the mechanism 24.

Referring again to FIG. 3, a screw driver 63 may be engaged through the emptiness 310 of the cylinder 31 for rotating the bolt 33 in order to adjust the distance between the piston 32 and the seat 10, whereby, the distance between the socket 25 and the head 62 may thus be changed; accordingly, the socket 25 may be engaged with various heads 62 of different height.

Figure 6:
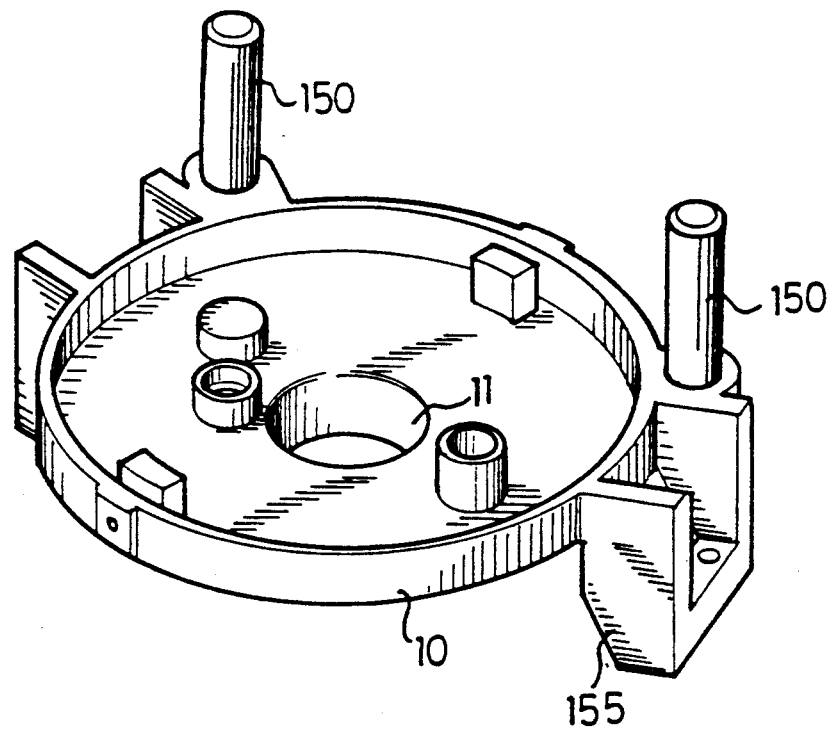
FIG. 6 is a perspective view showing a seat of a milling machine.
Figure 7:
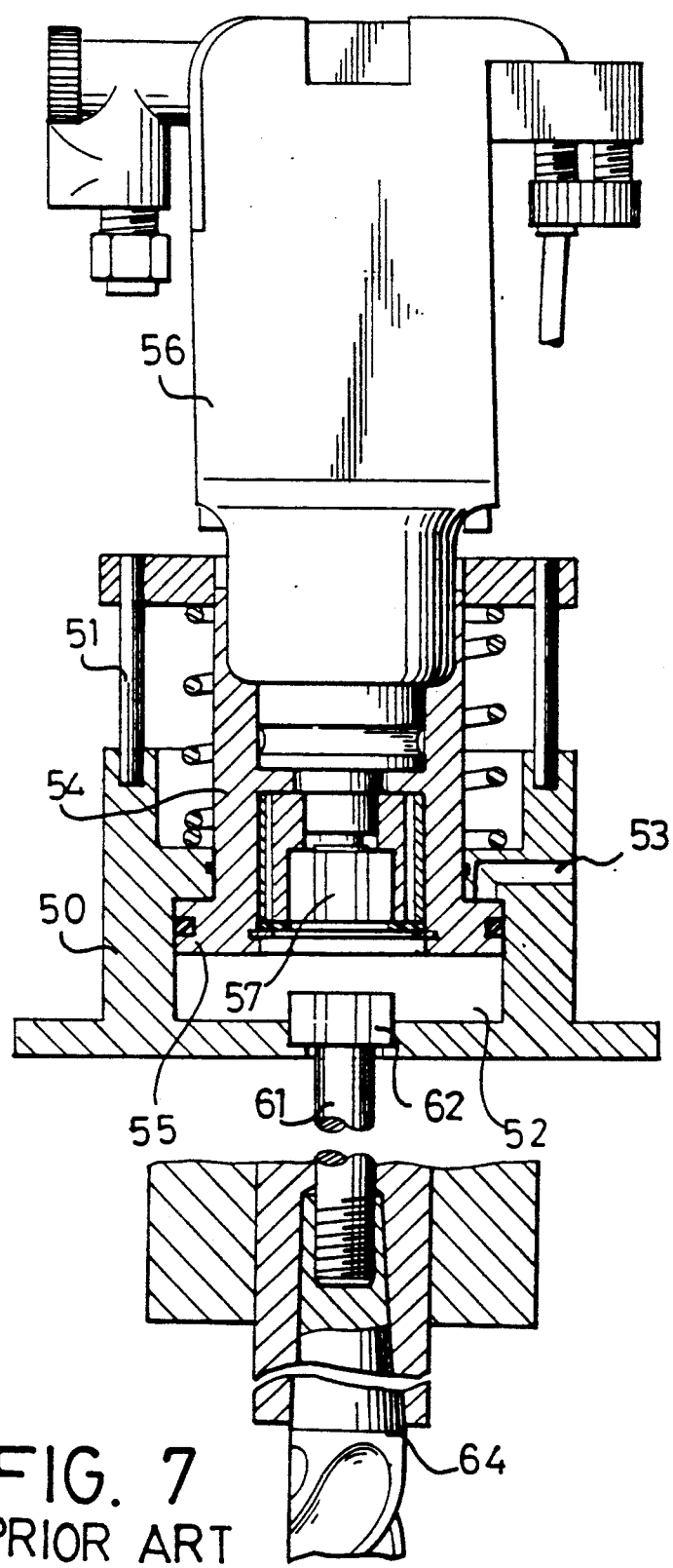
FIG. 7 is a partial cross sectional view showing the typical driving device of the milling machine.

Referring next to FIG. 6, another type of the seat 10 is shown and includes a pair of brackets 155 oppositely formed on the seat 10 for engagement with other parts of the milling machine; this type of seat 10 is provided in a multi-speed milling machine.

Accordingly, the driving device in accordance with the present invention includes a cylinder 31 and a driving mechanism separately supported on the milling machine such that the center of gravity thereof is lowered and such that the movement of the cylinder 31 is stable and generates no noise. The bolt 33 may be rotated and adjusted in order to fit various types of heads 62 of different height. The oil container 48 and the oil filter 47 can be easily coupled to various types of milling machine by the arm 40.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A driving device for driving a head of a rod in a milling machine comprising a column disposed on said milling machine, a bolt threaded to said milling machine, a board slidably engaged on said column and said bolt, a driving mechanism disposed on said board and including a lower end extended downward through said board, a socket secured to said lower end of said driving mechanism and located above said head of said rod, a cylinder fixed to said board and disposed on said bolt, a piston fixed on top of said bolt and in fluid tight engagement with said cylinder, means for biasing said board upward along said column and said bolt and means for admitting fluid power to said cylinder, whereby said socket is caused to engage with said head of said rod when said board and said driving mechanism are moved downward by said cylinder and when said cylinder moves downward relative to said piston.

2. A driving device according to claim 1, wherein said cylinder includes an aperture formed therein, said bolt is rotated when a tool is engaged through said aperture and engaged with said bolt, whereby the distance between said socket and said head of said rod is adjusted when said bolt is rotated.

3. A driving device according to claim 1, wherein said cylinder includes a coupler secured on said board and slidably engaged on said bolt and disposed below said cylinder, said coupler is connected to said cylinder for supplying pressurized air into said cylinder for actuating said cylinder.

* * * * *